Feb. 21, 1956         H. S. FORSBERG         2,735,455
PORTABLE HAND-HELD POWER SAW TOOL AND ANGLE GUIDE THEREFOR
Filed June 24, 1953         2 Sheets-Sheet 1
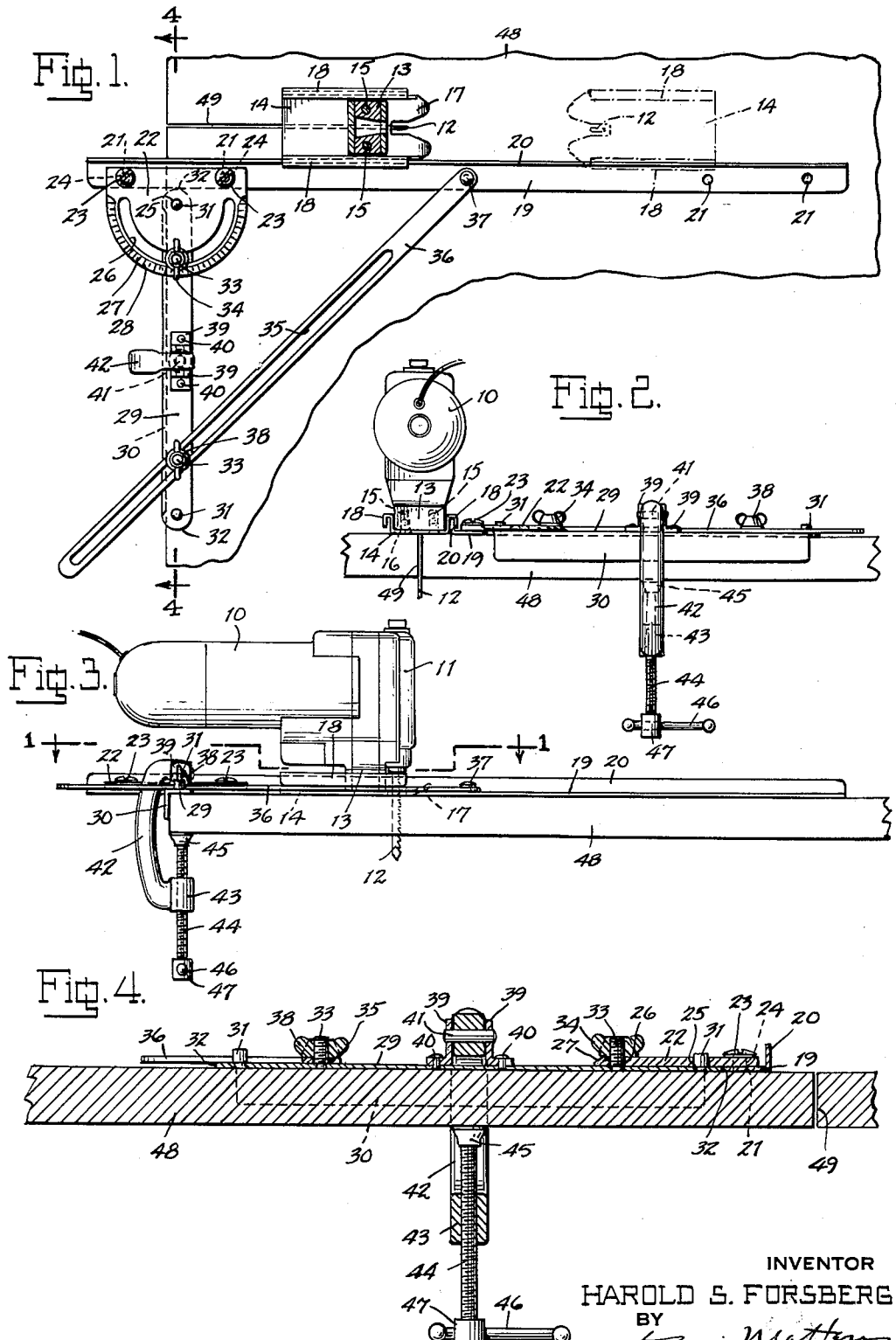
INVENTOR
HAROLD S. FORSBERG
BY
ATTORNEY Feb. 21, 1956          H. S. FORSBERG          2,735,455
PORTABLE HAND-HELD POWER SAW TOOL AND ANGLE GUIDE THEREFOR
Filed June 24, 1953          2 Sheets-Sheet 2
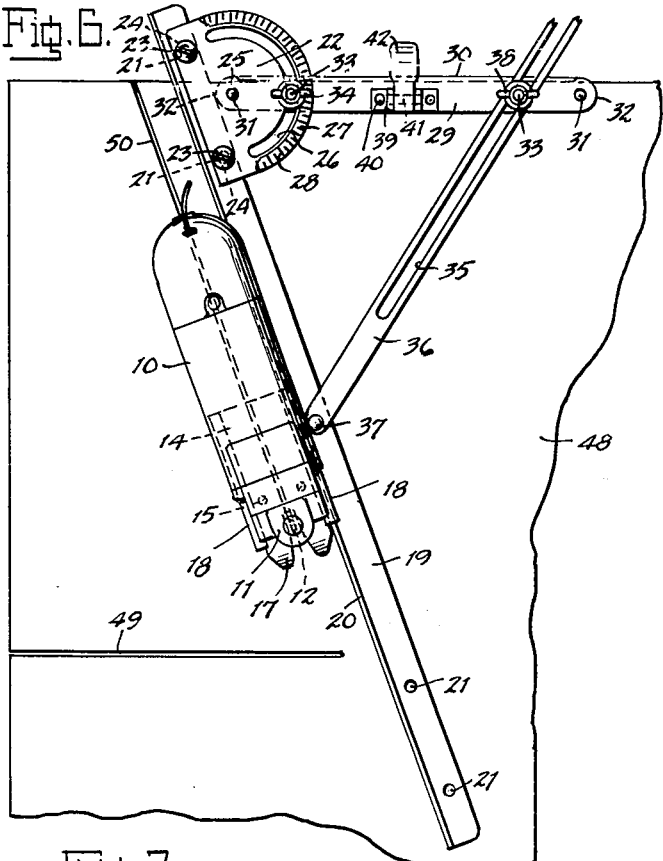
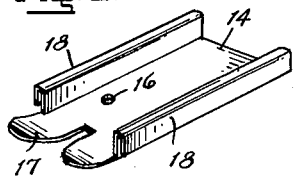
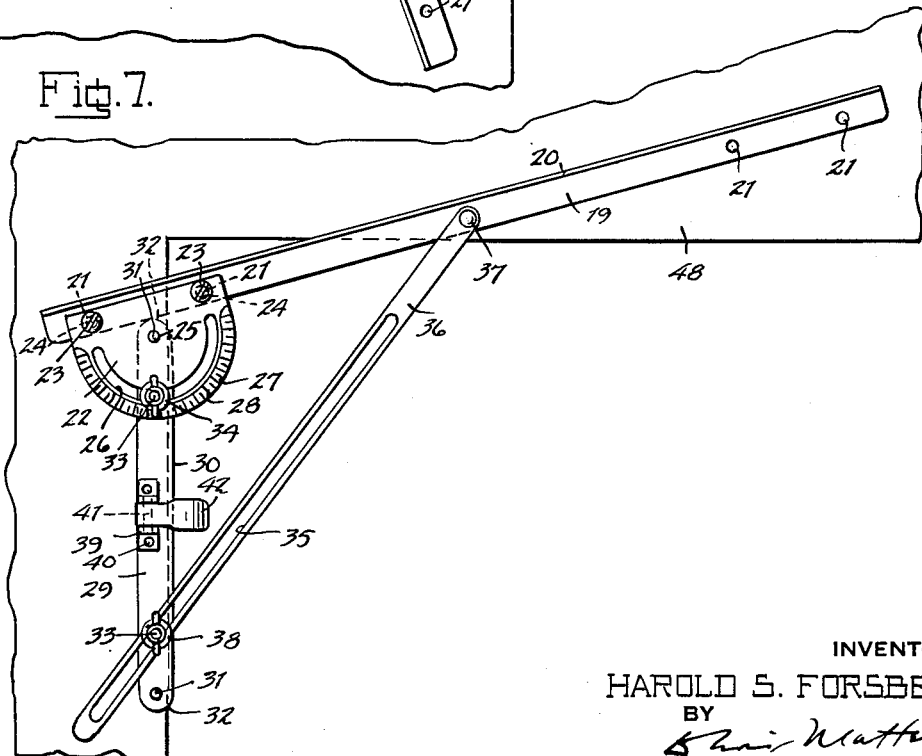
INVENTOR
HAROLD S. FORSBERG
BY
ATTORNEY

United States Patent Office 2,735,455
Patented Feb. 21, 1956

2,735,455

PORTABLE HAND-HELD POWER SAW TOOL AND ANGLE GUIDE THEREFOR

Harold S. Forsberg, Shelton, Conn.

Application June 24, 1953, Serial No. 363,817

3 Claims. (Cl. 143—6)

The present invention relates to a portable hand-held power saw tool and an angle guide therefore, an object of the invention being to provide a combination tool and guide wherein the tool is adapted to rest freely upon the work being cut, and includes cooperating means connectable to a part of the guide whereby the tool, in its movement upon the work, is maintained in alignment with the guide, it being a further object to provide such cooperative means enabling the tool to be operated in either direction with respect to the guide and for right or left hand operation.

A further object is to provide an angle guide which may be angularly adjusted with respect to an edge of the work to obtain 90° angle cuts with respect to an edge of the work, as well as angle cuts greater or less than 90°.

Another object is to provide an angle guide including a clamping bar for attachment to an edge of the work and a guide bar angularly adjustable with respect to the clamping bar, and further to provide for the selective attachment of the clamping bar to the guide bar so that in one position of attachment the guide bar may extend from one end of the clamping bar, while in another position of attachment the guide bar may extend from the other end of the clamping bar. Thus, it is possible to attach the angle guide to the work in any desired relation to the cut to be made, thereby making it possible, for instance, to remove a corner section from a large area board by two angle cuts while supporting the guide upon the respective edges of unremoved parts of the board.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a plan view of the angle guide of the invention shown attached to a board, and showing the cooperating saw shoe in engagement therewith, the saw being shown in horizontal section taken along the line 1—1 of Fig. 3, the dot-and-dash lines showing the saw shoe in a reverse relation to the angle guide for operation in opposite direction thereon from the direction of operation of the saw shoe shown in full lines;

Fig. 2 is a front elevation of the angle guide and saw attached to a board, as seen from the left in Fig. 1;

Fig. 3 is a side elevation, as seen from the lower side of Fig. 1;

Fig. 4 is a vertical sectional view, on an enlarged scale, taken along the line 4—4 of Fig. 1;

Fig. 5 is a perspective view of the saw shoe shown detached from the saw;

Fig. 6 is a plan view showing the angle guide with the clamping bar in another position of attachment to the guide bar from that shown in Fig. 1, and showing it attached to a board in the process of cutting a corner section therefrom; and Fig. 7 is a plan view showing another arrangement of the clamping bar, wherein it is adapted for clamping to an inside edge of a board, as distinguished from clamping to an outside edge as seen in Figs. 1 and 6.

Referring to the drawings, the portable hand-held power saw tool, constituting part of the invention, is preferably of the type disclosed in my U. S. Letters Patent No. 2,639,737 dated May 26, 1953, wherein a generally horizontal electric motor housing 10 is provided with a forward vertically disposed head 11 in which a downwardly projecting saw blade 12 is mounted for vertical reciprocation, being driven by suitable gearing from the motor. The head 11 has a downwardly extending shoe mounting pedestal portion 13, to the underside of which a forked shoe and blade guard 14 is secured by screws 15—15 engaged through countersunk screw holes 16—16 in the shoe. The forked forward end 17 has its sides curved upwardly so that the shoe constitutes a sled-like support for the tool which is adapted to be held in flat relation against the surface of the work being cut. The horizontally disposed motor housing portion 10 constitutes a convenient hand grip for holding the tool and controlling its movement.

It will be observed that the saw blade is disposed along the longitudinal center line of the shoe, and, according to the invention, the shoe is provided along each longitudinal edge outwardly of the pedestal portion 13 of the saw with upwardly extending inverted U-shaped cross-section channel guide portions 18—18, the outer flanges of which have their lower edges in upwardly offset relation to the lower surface of the shoe. Either one of these guide channels is adapted for guiding cooperating engagement with the angle guide of the invention, as will presently more fully appear, for the purpose of permitting the saw to be operated in either direction upon the angle guide, or for the purpose of engaging with the angle guide when the latter is disposed either at the right or left side of the saw. The channel guides 18 are such that they do not in any way interfere with the operation of the tool independently of the angle guide when it is desired to so operate it.

The angle guide bar 19, according to the invention, comprises a straight elongated bar formed of right angle cross-section bar stock, and includes a vertically disposed guide flange 20 along one longitudinal edge of a height slightly less than the internal height of the channel guide 18 of the shoe 14, and of such thickness that it will fit freely within the channel guides without appreciable side play, so that the shoe may be guided freely along the flange 20 while still maintaining a substantially constant parallel relation therewith. The upward spacing of the lower edge of each of the outer flanges of the channel guides 18 is such that when the lower surface of the shoe is flush with the lower surface of the guide bar 19, as seen in Figs. 2 and 4, the lower edge of the flange engaged with the guide bar is clear of its upper surface.

Adjacent each end of the guide bar 19, there is provided a pair of threaded screw receiving holes 21—21 for the selective mounting on the bar adjacent either of its ends of a sector plate 22, by means of screws 23 engaged through holes 24 in the sector plate. In outwardly spaced relation to the inner edge of the guide bar 19, the sector plate is provided with a pilot hole 25 disposed coincident to the radius center point of the plate, this point being midway between the screws 23. The sector plate is provided in concentric relation to the pilot hole 25 with a semi-circular slot 26, and outwardly of the slot with a concentric bevelled rim portion 27 carrying calibration markings 28 indicating angular adjustments between 0° and 180°.

A clamping bar 29 formed of right angle cross-section bar stock is provided with a vertically disposed longitudinal flange 30 for engagement with the vertical edge surface of a board upon which the guide is to be clamped, this bar being provided adjacent each of its ends with a pivot pin 31 centered with respect to the circumferentially rounded ends 32 of the bar and each adapted for selective engagement in the pilot hole 25 of the sector plate 22, depending upon the end of the bar 19 to which the sector plate is attached, or upon the desired relation of the clamping bar to the sector plate.

In inwardly and equally spaced relation to the respective pivot pins 31, the clamping bar is provided with threaded screw studs 33—33, either of which, depending upon the particular pivot pin engaged in the pilot hole 25, is engaged in the slot 26 of the sector plate, where it is adapted to be secured in the desired position of angular adjustment of the guide bar 19 with respect to the clamping bar by a wing nut 34 bearing upon the upper side of the sector plate. The threaded stud 33, which is not engaged in the slot 26, is engaged in the slot 35 of a strut bar 36 pivotally connected by a shouldered pivot stud 37 to the longitudinal center point of the guide bar 19, a wing nut 38 being engaged upon the stud 33 to secure the adjusted position of the strut bar with respect to the clamping bar.

Centrally of the clamping bar there are provided a pair of angle brackets 39 secured by rivets 40, and between which there is pivotally mounted upon a pivot pin 41 the upper end of a C-clamp 42 provided at its lower end with an internally threaded hub 43 engaged by a clamping screw 44 having a work engaging swivel head 45 at its upper end and a handle 46 at its lower end, the latter preferably consisting of a ball end slide rod engaged through a fixed head 47 provided upon the lower end of the screw.

As shown in Figs. 1–4, the angle guide is attached to one longitudinal edge of a board 48, and is set at 90° to guide the saw tool in making a 90° transverse cut 49, the tool being guided by the flange 20 of the guide bar 19 from the left hand edge toward the right hand edge. In this case the guide channel 18 at the right hand side of the shoe 14 is engaged with the flange 20. As shown by dot-and-dash lines, the position of the tool may be reversed so that it will cut from the right toward the left, and in this case the channel guide 18 at the left hand side of the shoe 14 is engaged with the flange 20.

Should it be desired to arrange the angle guide so as to be clamped to the same longitudinal side edge of the board above the cut rather than below the cut as shown, it is only necessary to remove the sector plate 22 from the left hand end of the guide bar 19 and attach it to the right hand end, at the same time reversing the position of the clamping bar 29 so that the C-clamp 42 is outwardly disposed. This operation is accomplished by first removing the wing nuts 34 and 38 to detach the clamping bar from the sector plate 22 and the strut bar 36, and thereupon removing the sector plate from the guide bar 19 by removing the screws 23 from the screw holes 21 at the left hand end, and then re-assembling the parts upon the other end of the guide bar by engaging the screws 23 in the screw holes 21 at the right hand end of the guide bar. The attachment of the sector plate to the right hand end of the guide bar 19 is shown in Fig. 6.

In Fig. 6 there is illustrated the manner in which the angle guide is attached to a board 48 for removing a corner section along an acute angle cutting line 50 following the production of a transverse cut 49 with the guide bar arranged as shown in Fig. 1.

In Fig. 7 there is illustrated a further arrangement in which the clamping bar is reversed in its relation to the sector plate from the arrangement shown in Fig. 1, so as to dispose the flange 30 and the C-clamp inwardly, thus enabling the angle guide to be secured to an inside edge of a board 48 or other structure to be sawed, as distinguished from its attachment to an outside edge of a board as shown in Figs. 1 and 6. In this example, the guide bar 19 is shown at an obtuse angle to the clamping bar.

What is claimed is:

1. An angle guide for a portable hand-held power saw tool or the like, comprising an elongated tool guide bar of right-angular cross-section including a horizontal base part and an upwardly extending vertical flange part at the outer edge of said base part, a planular sector plate including an attaching part adapted to overlie said base part of said guide bar and a projecting part adapted to project from the inner edge of said horizontal base part with its underside in the same horizontal plane as the upper side of said horizontal base part of said guide bar, said projecting part having pivot means and an arcuate slot concentric to said pivot means, means adjacent the respective ends of said guide bar and equidistant therefrom for the selective attachment thereto of said sector plate adjacent either of said ends, a clamping bar of right-angular cross-section having a horizontal base part and a downwardly extending vertical flange part, a pair of pivot means carried by said clamping bar one adjacent each end thereof and equidistant therefrom and each adapted for selective cooperative engagement with said pivot means of said sector plate through the engagement of the upper side of said base part of said clamping bar with the underside of said projecting part of said sector plate, said horizontal base parts of the said guide bar and said clamping bar being of corresponding thickness whereby in the connected relation of said clamping bar with said sector plate the undersides of both said horizontal base parts are in the same horizontal plane, a pair of securing means carried by said clamping bar one adjacent each end thereof and equidistant therefrom and each spaced inwardly from said respective pivot means a distance corresponding to the radius of said arcuate slot and adapted for cooperative engagement in said slot coincidentally with the engagement of said respective pivot means with said pivot means of said sector plate, and fastener means for cooperation with said securing means to secure the position of angular adjustment of said clamping bar relatively to said sector plate.

2. An angle guide for a portable hand-held power saw or the like, according to claim 1, characterized by a C-clamp pivotally attached substantially at the longitudinal center point of said clamping bar for securing said clamping bar to a board edge, said clamp being adapted in its operative clamping position to extend downwardly at the side of the vertical flange part of said clamping bar and inwardly beneath the horizontal base part thereof.

3. An angle guide for a portable hand-held power saw or the like, according to claim 1, characterized by a diagonally disposed strut bar pivotally connected at the longitudinal center point of the base part of said guide bar and having a longitudinal slot cooperatively disposed in relation to the one of said securing means of said clamping bar which is not in cooperative relation with said slot of said sector plate, said longitudinal slot being of the same transverse width as the arcuate slot of the sector plate.

References Cited in the file of this patent

UNITED STATES PATENTS

| | | |
|---|---|---|
| 113,531 | King | Apr. 11, 1871 |
| 778,178 | Dotts | Dec. 20, 1904 |
| 1,457,492 | Bloodgood | June 5, 1923 |
| 1,700,189 | Wikstrom | Jan. 29, 1929 |
| 1,828,043 | Hedgpeth | Oct. 20, 1931 |
| 1,911,045 | Tinnen | May 23, 1933 |
| 1,960,590 | McKay | May 29, 1934 |
| 2,556,137 | Emmons | June 5, 1951 |
| 2,625,184 | Harbert | Jan. 13, 1953 |
| 2,639,737 | Forsberg | May 26, 1953 |
| 2,651,333 | Spinney | Sept. 8, 1953 |